(12) United States Patent
Givens et al.

(10) Patent No.: US 10,160,265 B2
(45) Date of Patent: Dec. 25, 2018

(54) TIRE WITH REINFORCED TREAD

(71) Applicants: Bridgestone Americas Tire Operations, LLC, Nashville, TN (US); Bridgestone Corporation, Tokyo (JP)

(72) Inventors: Samuel O. Givens, Copley, OH (US); Dennis W. Snyder, Uniontown, OH (US); Bradley J. Harris, New London, OH (US); Steven M. Sawyer, Akron, OH (US); Kevin J. Kosmac, Fairlawn, OH (US); Jeffrey D. Parker, Copley, OH (US); Masataka Uchiyama, Tokyo (JP); Nobuo Shimizu, Saitama Prefecture (JP); Leonard M. Shoun, Kent, OH (US); Matthew T. Schreiner, Akron, OH (US)

(73) Assignees: Bridgestone Americas Tire Operations, LLC, Nashville, TN (US); Bridgestone Corporation, Tokyo (JP)

( * ) Notice: Subject to any disclaimer, the term of this patent is extended or adjusted under 35 U.S.C. 154(b) by 176 days.

(21) Appl. No.: 15/107,385

(22) PCT Filed: Dec. 12, 2014

(86) PCT No.: PCT/US2014/069891
§ 371 (c)(1),
(2) Date: Jun. 22, 2016

(87) PCT Pub. No.: WO2015/100029
PCT Pub. Date: Jul. 2, 2015

(65) Prior Publication Data
US 2017/0021673 A1 Jan. 26, 2017

Related U.S. Application Data

(60) Provisional application No. 61/920,298, filed on Dec. 23, 2013.

(51) Int. Cl.
*B60C 11/00* (2006.01)
*B60C 11/13* (2006.01)
(Continued)

(52) U.S. Cl.
CPC ........ *B60C 11/005* (2013.01); *B29D 30/0681* (2013.01); *B60C 1/0016* (2013.01);
(Continued)

(58) Field of Classification Search
CPC ....... B60C 1/00; B60C 1/0016; B60C 1/0025; B60C 2011/0083; B60C 11/00;
(Continued)

(56) References Cited

U.S. PATENT DOCUMENTS 2,710,042 A * 6/1955 Gates, Jr. ............... B29D 30/66
152/209.5
3,149,658 A * 9/1964 Wolfe ................ B29D 30/0061
152/209.4
(Continued)

FOREIGN PATENT DOCUMENTS

CN 2403601 Y 11/2000
CN 1839056 9/2006
(Continued)

OTHER PUBLICATIONS

English Abstract of DE102006043606, dated Mar. 27, 2008.
(Continued)

*Primary Examiner* — Eric Hug

(57) ABSTRACT

A tire includes a circumferential tread constructed of a base material. The circumferential tread has a plurality of bars, each of the plurality of bars having a top surface and a plurality of side surfaces. The circumferential tread further has a plurality of valleys disposed between the plurality of bars. A reinforcement layer covers at least some of the
(Continued)

plurality of valleys and an outer layer covers at least a portion of the reinforcement layer.

20 Claims, 4 Drawing Sheets

(51) Int. Cl.
B60C 9/12 (2006.01)
B29D 30/06 (2006.01)
B60C 1/00 (2006.01)

(52) U.S. Cl.
CPC ............... B60C 9/12 (2013.01); B60C 11/00 (2013.01); B60C 11/0008 (2013.01); B60C 11/1346 (2013.01); B60C 2011/0016 (2013.01); B60C 2200/08 (2013.01)

(58) Field of Classification Search
CPC ......... B60C 11/0008; B60C 2011/0016; B60C 2011/0033; B60C 11/0041; B60C 11/005; B60C 9/12; B60C 9/18; B60C 9/1807; B60C 2009/1814; B60C 9/1821; B60C 11/13; B60C 11/1307; B60C 11/1346; B60C 11/24
USPC ................................ 152/209.4, 209.5, 154.2
See application file for complete search history.

(56) References Cited

U.S. PATENT DOCUMENTS

| | | |
|---|---|---|
| 3,233,649 A | 2/1966 | Jolivet et al. |
| H001283 H * | 2/1994 | Porto ..................... 152/154.2 |
| 5,614,041 A * | 3/1997 | Dumke .................. B60C 11/00 152/209.5 |
| 5,901,765 A | 5/1999 | Bonko |
| 6,450,221 B1 | 9/2002 | Bonko |
| 9,073,389 B2 | 7/2015 | Buxton et al. |
| 2004/0182486 A1 | 9/2004 | Bernard et al. |
| 2005/0139302 A1 | 6/2005 | Reuter et al. |
| 2007/0187030 A1 | 8/2007 | Bernard et al. |
| 2007/0277920 A1 | 12/2007 | Reuter et al. |
| 2009/0107609 A1 | 4/2009 | Westgate et al. |
| 2010/0018625 A1 | 1/2010 | Imhoff et al. |
| 2014/0311641 A1 * | 10/2014 | El-Harak ............. B60C 1/0016 152/209.18 |

FOREIGN PATENT DOCUMENTS

| | | | |
|---|---|---|---|
| CN | 201941529 U | 8/2011 | |
| DE | 1505144 A1 | 5/1969 | |
| DE | 102006043606 A1 | 3/2007 | |
| EP | 0 370 664 | 5/1990 | |
| EP | 0795427 A | 9/1997 | |
| EP | 0798142 | 10/1997 | |
| EP | 1 512 554 | 3/2005 | |
| JP | 10-272706 | 10/1998 | |
| JP | 2008-144044 | 6/2008 | |
| WO | WO1998008697 A | 3/1998 | |
| WO | WO2001017801 A | 3/2001 | |
| WO | WO2003/028988 A1 | 4/2003 | |
| WO | WO-2013087878 A1 * | 6/2013 | ........... B60C 1/0016 |
| WO | WO2014/022199 A1 | 2/2014 | |

OTHER PUBLICATIONS

Machine translation of DE1505144, dated May 22, 1969.
European Search Opinion, dated Jun. 28, 2017.
European Search Report, dated Jun. 28, 2017.
English Abstract of CN2403601, dated Nov. 1, 2000.
English Abstract of CN201941529, dated Aug. 24, 2011.
The International Search Report and Written Opinion issued in PCT/US2014/069891, dated Mar. 31, 2015.
English Abstract of EP0798142, dated Oct. 1, 1997.
English Abstract of CN1839056, dated Sep. 27, 2006.

* cited by examiner

TIRE WITH REINFORCED TREAD

FIELD OF INVENTION

The present disclosure relates to a tire having a reinforced tread. More particularly, the present disclosure relates to a tire having a reinforcement layer disposed above a base rubber layer.

BACKGROUND

Known tire treads are rubber compositions which contain at least some carbon black reinforcement and are thereby black in color. The rubber of a tread may be selected for its material properties, such as its hardness. As the tread wears, the tread rubber maintains the same material properties.

SUMMARY OF THE INVENTION

In one embodiment, a tire includes a pair of sidewalls and a circumferential tread constructed of a base rubber. The circumferential tread has a plurality of bars and a plurality of valleys disposed between the plurality of bars. The tire further includes a fabric reinforcement layer disposed on the circumferential tread, such that the fabric reinforcement layer covers the plurality of bars and the plurality of valleys.

In another embodiment, a tire includes a circumferential tread constructed of a base material. The circumferential tread has a plurality of bars, each of the plurality of bars having a top surface and a plurality of side surfaces. The circumferential tread further has a plurality of valleys disposed between the plurality of bars. A reinforcement layer covers at least some of the plurality of valleys and an outer layer covers at least a portion of the reinforcement layer.

In yet another embodiment, an agricultural tire includes a pair of sidewalls and a circumferential tread constructed of a base rubber. The circumferential tread has a plurality of bars, each of the plurality of bars having a top surface and a plurality of side surfaces. The circumferential tread further has a plurality of valleys disposed between the plurality of bars. A reinforcement layer is disposed on the circumferential tread, such that the reinforcement layer covers at least a portion of the side surfaces of the plurality of bars and further covers the plurality of valleys. An outer layer is disposed on at a least a portion of the reinforcement layer.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
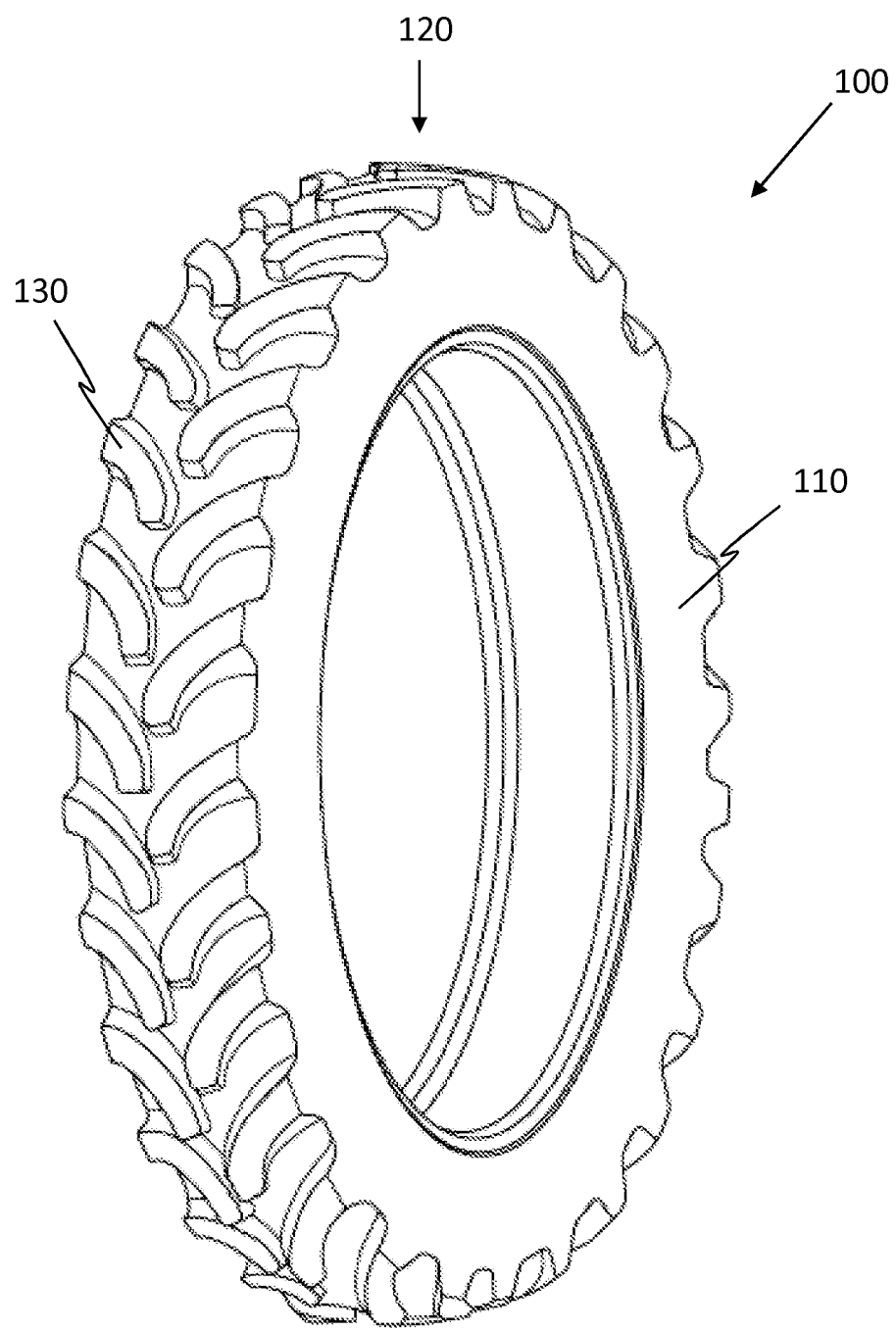
FIG. 1 is a perspective view of one embodiment of a tire having a reinforced tread.

The following includes definitions of selected terms employed herein. The definitions include various examples or forms of components that fall within the scope of a term and that may be used for implementation. The examples are not intended to be limiting. Both singular and plural forms of terms may be within the definitions.

"Axial" or "axially" refer to a direction that is parallel to the axis of rotation of a tire.

"Bar" or "bars" refer to the raised portion of the tread.

"Bead" refers to the part of the tire that contacts the wheel and defines a boundary of the sidewall.

"Circumferential" and "circumferentially" refer to a direction extending along the perimeter of the surface of the tread perpendicular to the axial direction.

"Equatorial plane" refers to the plane that is perpendicular to the tire's axis of rotation and passes through the center of the tire's tread.

"Sidewall" refers to that portion of the tire between the tread and the bead.

"Tread" refers to that portion of the tire that comes into contact with the road under normal inflation and load.

"Valley" or "valleys" refer to the void between bars on a tread.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

FIGS. 1-5 show various embodiments of tires having a reinforcement layer disposed on a base layer of the tire. The reinforcement layer may be constructed of fabric, rubber fabric composite, or another polymeric material. For example, the reinforcement layer may be constructed of polyester, nylon, or aramid fiber. Exemplary aramid fiber includes, without limitation, 1500/2 fibers (i.e., 2 strands of fibers having a denier of 1500) and 3000/2 fibers.

In one embodiment, the fabric reinforcement layer includes a woven mesh of fibers. In an alternative embodiment, the fabric reinforcement layer includes continuous cords of fiber. In such an embodiment, the continuous cords may be parallel to each other, and may extend in a circumferential direction, a lateral direction, or at an acute angle with respect to the circumferential direction. In another alternative embodiment, the fabric reinforcement layer may be a layer of elastomeric material having chopped fibers distributed throughout the layer. The distribution of chopped fibers may be random or follow a predetermined pattern. In one example of a predetermined patter, the chopped fibers are aligned in the same direction.

In one embodiment, the reinforcement layer has a nominal thickness of 1.0 to 10.0 millimeters. In another embodiment, the reinforcement layer has a nominal thickness of less than 1.0 millimeter. However, it should be understood that thicker reinforcement layers may be employed. For example, in certain embodiments, it may be desirable to use a thicker reinforcement layer on larger tires. Accordingly, the thickness of the reinforcement layer may be scaled according to tire size. For example, in certain embodiments, the thickness of the reinforcement layer may be 2-10% of the base material. In other embodiments, the thickness of the reinforcement layer may be 2-15% of the base material. The desired thickness may vary according to the application, and expected speed of the vehicle. The thickness of the reinforcement layer may be exaggerated in the drawings for illustrative purposes.

In the illustrated embodiments, an outer layer is disposed on the reinforcement layer. In one embodiment, the outer layer is constructed of the same material as the base layer. Alternatively, the outer layer may be constructed of a different material. The outer layer may be a laminate constructed of rubber, a rubber fabric composite, or another polymeric material. The outer layer may serve an aesthetic purpose, as it may not be desirable aesthetically for a fabric layer to be exposed. The outer layer may also function as a protective layer.

In one embodiment, the outer layer has a nominal thickness of 1.0 to 10.0 millimeters. In another embodiment, the outer layer has a nominal thickness of less than 1.0 millimeter. However, it should be understood that thicker outer layers may be employed. For example, in certain embodiments, it may be desirable to use a thicker outer layer on larger tires. Accordingly, the thickness of the outer layer may be scaled according to tire size. For example, in certain embodiments, the thickness of the outer layer may be 2-15% of the base material. In other embodiments, the thickness of the outer layer may be 2-20% of the base material. The desired thickness may vary according to the application, and expected speed of the vehicle. The thickness of the outer layer may be exaggerated in the drawings for illustrative purposes. In alternative embodiments, the outer layer may be omitted.

FIG. 1 illustrates a perspective view of one embodiment of a tire 100 having a reinforcement layer (not shown) and an outer layer 110. In the illustrated embodiment, the reinforcement layer and the outer layer 110 cover substantially the entire external surface of the tire. In the illustrated embodiment, the tire 100 has a circumferential tread 120 with a plurality of bars 130. In alternative embodiments (not shown), the tire may include one or more solid circumferential ribs, or one or more blocks. It should be understood that the tire is not limited to having any particular tread design.

The circumferential tread 120 is constructed of a base rubber, or base material. The reinforcement layer is constructed of fabric. In one embodiment, the outer layer 110 is constructed of the same material as the base material. In an alternative embodiment, the outer layer is constructed of a material different from the base material and has different properties from the underlying circumferential tread 120.

While FIG. 1 illustrates a tire 100 suitable for an agricultural vehicle, this tire is merely exemplary. It should be understood that the reinforcement layer described herein may be employed on tires for any vehicle, including without limitation, bicycles, motorcycles, all-terrain vehicles, cars, trucks, tractors and other agricultural vehicles, off-road vehicles, mining vehicles, airplanes, and all other wheeled vehicles. The material properties of the reinforcement layer may be varied according to the vehicle type, and the expected use of the tire.

Figure 2:
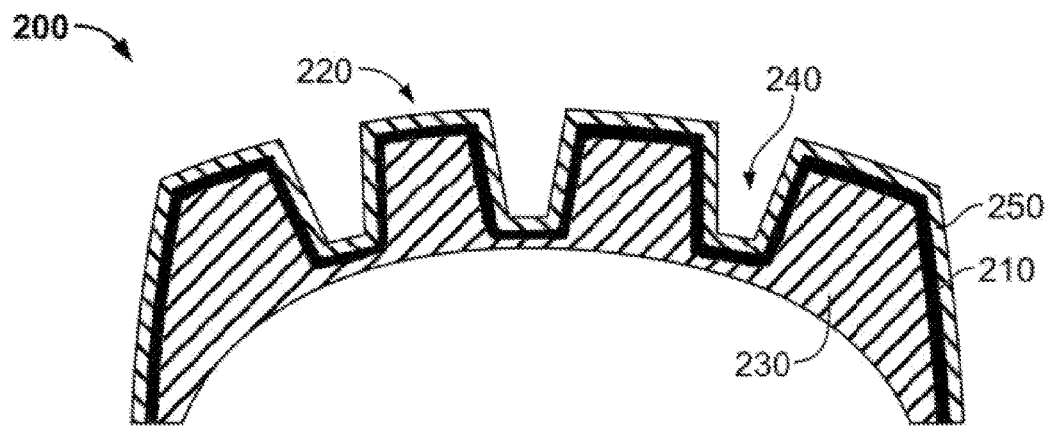
FIG. 2 is a cross-section of one embodiment of a tire having a reinforcement layer disposed on a base layer of a circumferential tread.

FIG. 2 illustrates a cross-section of one embodiment of a tire 200 having a reinforcement layer 210 disposed on a circumferential tread 220. The reinforcement layer 210 covers both the top surface of the bars 230 and the valleys 240 between the bars 230. In other tires, such as passenger car tires, the reinforcement layer 210 may also cover slots, sipes, and other tread elements (not shown).

In the illustrated embodiment, an outer layer 250 covers the reinforcement layer 210. In an alternative embodiment (not shown), all or part of the outer layer may be omitted, such that at least a part of the reinforcement layer is exposed.

Figure 3:
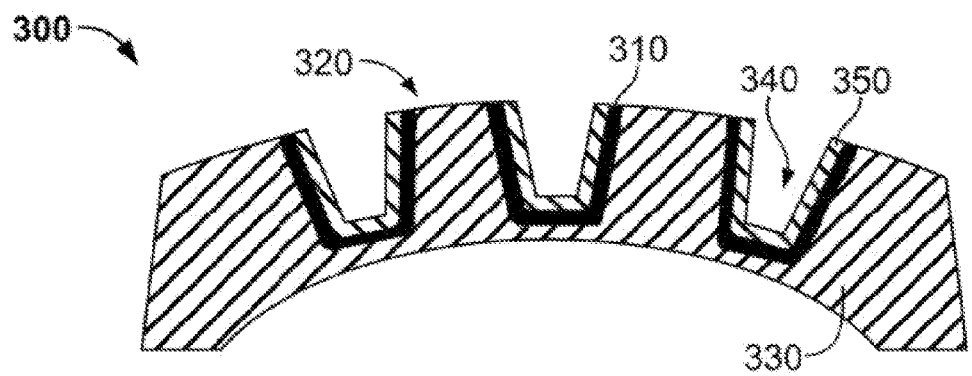
FIG. 3 is a cross-section of one embodiment of a tire having a reinforcement layer disposed on portions of a base layer of a circumferential tread.

FIG. 3 illustrates a cross-section of one embodiment of a tire 300 having a reinforcement layer 310 disposed on a circumferential tread 320. In this embodiment, the reinforcement layer 310 only covers the surface of valleys 340 between bars 330, without covering the top surfaces of the bars 330. In other tires, such as passenger car tires, the reinforcement layer 310 may also cover slots, sipes, and other tread elements (not shown).

In the illustrated embodiment, an outer layer 350 covers the reinforcement layer 310. In an alternative embodiment (not shown), all or part of the outer layer may be omitted, such that at least a part of the reinforcement layer is exposed.

In one embodiment, tires 200 and 300 are the same, with FIG. 2 illustrating the tire in a new condition and FIG. 3 illustrating the tire in a partially worn condition in which the reinforcement layer 310 and the outer layer 350 have worn off the top of the bars 330, but remain in the valleys 340 between the bars. In such an embodiment, the reinforcement layer 310 and the outer layer 350 remain in the valleys 340 as the tire wears further.

Alternatively, the tire 300 may be made by first covering the entire circumferential tread 320 with the reinforcement layer 310 and the outer layer 350, such that the reinforcement layer 310 and the outer layer 350 cover both the top surface of the bars 330 and the valleys 340 disposed therein. The reinforcement layer 310 and the outer layer 350 on the top surface of the bars 330 are then buffed off or ground away, using an abrasive grinding material. In such an embodiment, the reinforcement layer or the outer layer may be recycled after being ground off the tire.

In an alternative method of making the tire 300, the reinforcement layer 310 and the outer layer 350 are only disposed on the surface of the valleys 340. The top surfaces of the bars 330 are left uncovered by the reinforcement layer 310 and the outer layer 350. In such an embodiment, no grinding or wearing of the reinforcement layer 310 or the outer layer 350 is necessary.

Figure 4:
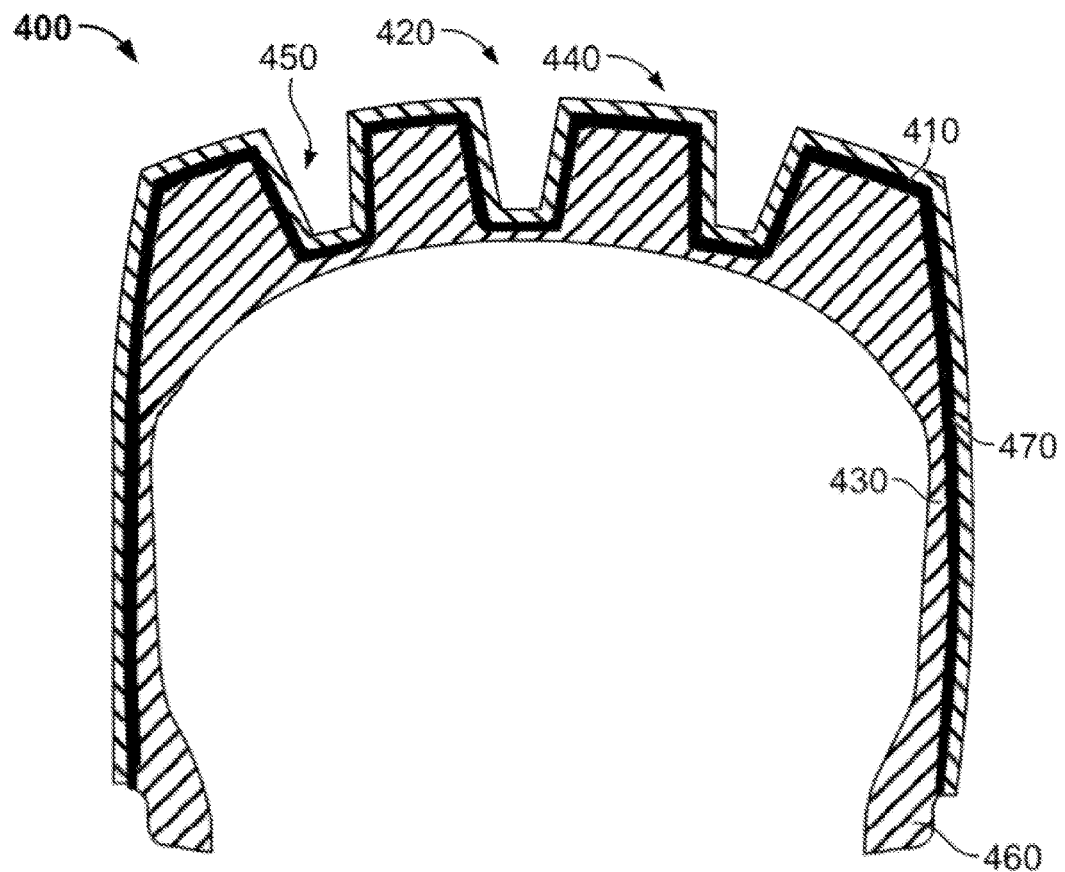
FIG. 4 is a cross-section of one embodiment of a tire having a reinforcement layer disposed on a base layer of a circumferential tread and sidewalls.

FIG. 4 illustrates a cross-section of one embodiment of a tire 400 having a reinforcement layer 410 disposed on a circumferential tread 420 and a pair of sidewalls 430. The reinforcement layer 410 covers both the top surfaces of bars 440 and the valleys 450 disposed there between. In other tires, such as passenger car tires, the reinforcement layer 410 may also cover slots, sipes, and other tread elements (not shown).

In the illustrated embodiment, the reinforcement layer 410 extends down each sidewall 430 to the heel 460 of the tire 400. In alternative embodiments (not show), the reinforcement layer may only cover a portion of each sidewall. It should be understood that the coverage of each sidewall need not be the same. For example, the reinforcement layer may cover an outer sidewall of a tire, but not the inner sidewall of the tire.

In the illustrated embodiment, an outer layer 450 covers the reinforcement layer 410. In an alternative embodiment (not shown), all or part of the outer layer may be omitted, such that at least a part of the reinforcement layer is exposed.

While the coverage of the reinforcement layer 410 and the outer layer 450 are shown as continuous, it should be understood that gaps may exist. For example, the reinforcement layer 410 and the outer layer 450 may be disposed on the surface of valleys 450 of a circumferential tread 420, but not on the top surface of the bars 440 in the same manner shown in FIG. 3. Additionally, portions of the sidewall 430 may be left uncovered or the reinforcement layer and the outer layer may be ground away from portions of the sidewall 430.

Figure 5:
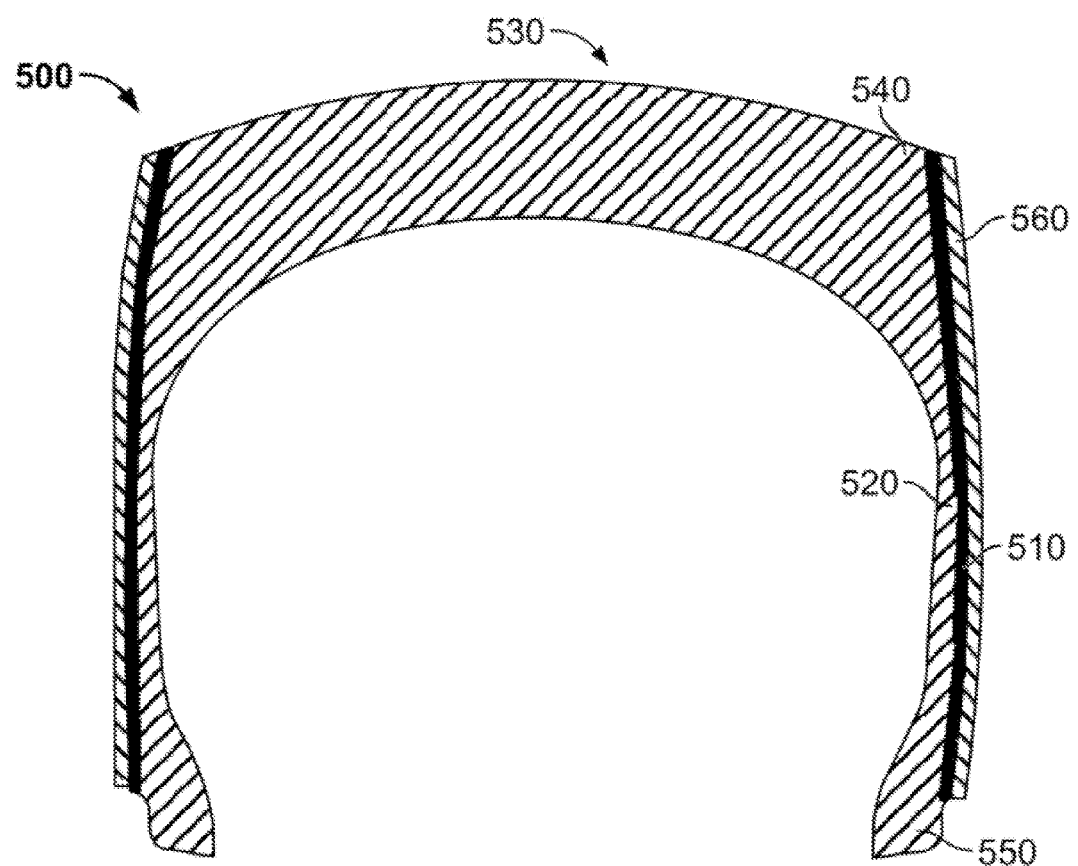
FIG. 5 is a cross-section of one embodiment of a tire having a reinforcement layer disposed on a base layer of a pair of sidewalls.

FIG. 5 illustrates a cross-section of one embodiment of a tire 500 having a reinforcement layer 510 disposed on a pair of sidewalls 520. In the illustrated embodiment, the reinforcement layer 510 does not cover a circumferential tread 530 of the tire 500. Instead, the reinforcement layer 510 extends from a shoulder portion 540 of each sidewall 520 to the heel 550 of the tire 500. In alternative embodiments (not show), the reinforcement layer may only cover a portion of each sidewall. It should be understood that the coverage of each sidewall need not be the same. For example, the reinforcement layer may cover an outer sidewall of a tire, but not the inner sidewall of the tire.

In the illustrated embodiment, an outer layer 560 covers the reinforcement layer 510. In an alternative embodiment (not shown), all or part of the outer layer may be omitted, such that at least a part of the reinforcement layer is exposed.

In any of the above described embodiments, the reinforcement layer may be selected for its material properties. In one example, the reinforcement layer is constructed of a material that is harder than the underlying rubber of the tire. In one specific embodiment, the reinforcement layer has a greater hardness than the base rubber, as determined using a durometer Shore A scale. In one example embodiment, the reinforcement layer has a hardness that is 0 to 40% greater than the hardness of the base material. In a more specific example, the reinforcement layer has a hardness that is at least 10% greater than the hardness of the base material. Additionally, in this embodiment, the reinforcement layer has a greater elongation at break than the base rubber. In one example embodiment, the reinforcement layer has an elongation at break that is 0 to 40% greater than the elongation at break of the base material. In a more specific example, the reinforcement layer has an elongation at break that is at least 10% greater than the elongation at break of the base material. Such a reinforcement material may be useful in agricultural tires, and tires for off-road vehicles. As is understood in the art, agricultural tires are susceptible to damage from corn stalks, rocks, and other hard objects. Likewise, tires on off-road vehicles are susceptible to damage from rocks and other hard objects.

Where an outer layer is employed, the outer layer may be similarly selected for its material properties. In one example, the outer layer is constructed of a material that is harder than the underlying rubber of the tire. In one specific embodiment, the outer layer has a greater hardness than the base rubber, as determined using a durometer Shore A scale. In one example embodiment, the outer layer has a hardness that is 0 to 40% greater than the hardness of the base material. In a more specific example, the outer layer has a hardness that is at least 10% greater than the hardness of the base material. Additionally, in this embodiment, the outer layer has a greater elongation at break than the base rubber. In one example embodiment, the outer layer has an elongation at break that is 0 to 40% greater than the elongation at break of the base material. In a more specific example, the outer layer has an elongation at break that is at least 10% greater than the elongation at break of the base material.

In such embodiments, the reinforcement layer or the outer layer may have material properties that provide performance different than the base rubber. Accordingly, the nominal thickness of the reinforcement layer or the outer layer may be selected such that the respective layer is thick enough to provide adequate protection of the tire, but thin enough so as not to result in undesirable performance tradeoffs, such as heat and rolling resistance.

In one embodiment, the use of a reinforcement layer or outer layer on the tread of a tire enhances performance as the tire wears. For example, where a reinforcement layer or outer layer is disposed on the top surface of the tread and in the grooves (such as shown in FIG. 2), the reinforcement layer or outer layer on the top surface of the tread wears away during use of the tire, resulting in a tire having reinforcement layer or outer layer only in the grooves of the tire (such as shown in FIG. 3). In one known embodiment, the reinforcement layer or outer layer in the grooves is an ideal winter material that improves snow performance.

In one particular embodiment, at least one of the reinforcement layer and the outer layer does not include carbon black. In such an embodiment, the reinforcement layer or outer layer may include pigments of any color or combination of colors. Colors may be employed for aesthetic reasons. For example, the reinforcement layer or outer layer may be colored to display a design, text, logos, brand names, or other pictures or photographs. A user may determine that it is aesthetically pleasing to have a particular color disposed only in the grooves, or disposed on both the tread and the grooves. Multiple colors may be employed on a single reinforcement layer or outer layer. For example, the reinforcement layer or the outer layer may have colors in a camouflage pattern. In one embodiment, a user may customize the tire by providing an image that is transferred to the reinforcement layer or outer layer.

Although FIGS. 1-5 display the use of a single reinforcement layer and a single outer layer, it should be understood that more than one reinforcement layer or more than one outer layer may be employed. In one embodiment, different reinforcement layers or outer layers are employed in different sections of the tire. For example, different reinforcement layers or outer layers may be used on a sidewall, top surface of a tread, and grooves of a tread. Where multiple reinforcement layers or outer layers are disposed on different portions of the tire, different colored reinforcement layers or outer layers may be employed to form a desired pattern. For example, different reinforcement layers or outer layers may be used to form a camouflage pattern on the tire.

In an alternative embodiment, one or more reinforcement layers or outer layers may be layered on top of one another. Where layers of reinforcement layers or outer layers are disposed on the top surface of a tread, each layer is worn away during use of the tire. As the first layer is worn, the second layer becomes exposed. In such a configuration, each reinforcement layer or outer layer may have a different color.

An observer will then be able to visually detect as layers are worn away and other layers are exposed.

Additionally, where multiple reinforcement layers or outer layers are employed, each layer may have a different material property. For example, an outer layer may be constructed of a material that exhibits superior snow performance, an inner layer may be constructed of a material that exhibits superior wet performance, and the remaining compound of the tire may be constructed of a material that exhibits superior dry performance. Such a tire may be suitable for geographic locations that have a snowy winter, followed by a wet spring, and a dry summer. The nominal thickness of each layer may be selected based on the various wear rates for each weather condition.

In another example, a first layer may be an ozone resistant material and a second layer may be a softer material for cold weather and snow performance. During the curing of the tire, the ozone resistant material may leach from the first layer into the second layer.

The reinforcement layer may be applied to the tire in a number of different ways. In one embodiment, multiple sheets of reinforcement material are separately applied to a green tire at desired locations. Rollers may be used to press the reinforcement layer against the base rubber and force out air that has been trapped between the reinforcement layer and the base rubber. Such a process may be referred to as "stitching." After the reinforcement layer has been placed on the base rubber and optionally stitched, the green tire and reinforcement layer are cured.

In one embodiment, the reinforcement is a sheet that is placed on the green tire. In an alternative embodiment, the reinforcement layer is a ribbon that is wound about the green tire, or is disposed only in the grooves of the tire. In another alternative embodiment, the reinforcement layer includes a plurality of patches that are placed at desired locations on the green tire.

In another alternative embodiment, the reinforcement material may be placed in a vulcanization mold before a green tire is placed in the mold. The green tire and the reinforcement material are then cured together.

Where an outer layer is employed, the outer layer may be applied to the tire in a number of different ways. In one embodiment, the outer layer is disposed on the tire by co-extruding the outer layer with the base rubber of the tire.

In an alternative embodiment, the outer layer is disposed on the tire by forming a thin sheet of material and separately applying to a green tire. The outer layer is then placed on a desired location of the green tire. Rollers may be used to press the outer layer against the base rubber and force out air that has been trapped between the outer layer and the base rubber. Such a process may be referred to as "stitching." After the outer layer has been placed on the base rubber and optionally stitched, the green tire and outer layer are cured.

In one embodiment, the outer layer is a sheet that is placed on the green tire. In an alternative embodiment, the outer layer is a ribbon that is wound about the green tire, or is disposed only in the grooves of the tire.

In another alternative embodiment, the outer layer is disposed on a cured tire. Such an outer layer may be applied to the tire using a vacuum process. In one embodiment, the outer layer is a sheet that is placed on the cured tire. In an alternative embodiment, the outer layer is a ribbon that is wound about the cured tire, or is disposed only in the grooves of the tire.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A tire comprising:
   a pair of sidewalls;
   a circumferential tread constructed of a base rubber, the circumferential tread having a plurality of bars and a plurality of valleys disposed between the plurality of bars;
   a first fabric reinforcement layer disposed on the circumferential tread, such that the first fabric reinforcement layer covers the plurality of bars and the plurality of valleys, the first fabric reinforcement layer having a first color; and
   a second fabric reinforcement layer disposed on the first fabric reinforcement layer, such that the second fabric reinforcement layer covers the first fabric reinforcement layer, the second fabric reinforcement layer having a second color different than the first color so as to facilitate visual detection of wear of the tire,
   wherein at least one of the first and second fabric reinforcement layers has a hardness that is at least 10% greater than the hardness of the base rubber.

2. The tire of claim 1, wherein the first fabric reinforcement layer has a nominal thickness of between 1 millimeters and 10 millimeters.

3. The tire of claim 1, further comprising an outer layer disposed on the second fabric reinforcement layer.

4. The tire of claim 3, wherein the outer layer is constructed of the same material as the base rubber.

5. The tire of claim 3, wherein the outer layer is a polymeric laminate having a hardness greater than a hardness of the base rubber.

6. The tire of claim 1, wherein the first fabric reinforcement layer covers at least one of the pair of sidewalls.

7. The tire of claim 1, wherein the first fabric reinforcement layer has a greater hardness than the base rubber.

8. A tire, comprising:
   a pair of sidewalls;

a circumferential tread constructed of a base rubber, the circumferential tread having a plurality of bars and a plurality of valleys disposed between the plurality of bars; and a fabric reinforcement layer disposed on the circumferential tread, such that the fabric reinforcement layer covers the plurality of bars and the plurality of valleys, wherein the fabric reinforcement layer has a hardness that is at least 10% greater than the hardness of the base rubber.

9. A tire comprising:

a circumferential tread constructed of a base material,
wherein the circumferential tread has a plurality of bars, each of the plurality of bars having a top surface and a plurality of side surfaces, and
wherein the circumferential tread further has a plurality of valleys disposed between the plurality of bars;

a first reinforcement layer covering at least some of the plurality of valleys, the first reinforcement layer having a first color;

a second reinforcement layer disposed on the first reinforcement layer, such that the second reinforcement layer covers the first reinforcement layer, the second reinforcement layer having a second color different than the first color so as to facilitate visual detection of wear of the tire; and an outer layer covering at least a portion of the second reinforcement layer, wherein at least one of the first and second fabric reinforcement layers has a hardness that is at least 10% greater than the hardness of the base material.

10. The tire of claim 9, wherein the first reinforcement layer covers at least some sidewalls of at least some of the plurality of bars.

11. The tire of claim 9, wherein the first reinforcement layer covers at least some of the top surfaces of at least some of the plurality of bars.

12. The tire of claim 9, wherein the first reinforcement layer has a greater hardness than the base material.

13. The tire of claim 9, wherein the outer layer covers the entire second reinforcement layer.

14. The tire of claim 9, wherein the tire is constructed by stitching the first reinforcement layer to a green tire.

15. The tire of claim 9, wherein the first reinforcement layer is a fabric reinforcement layer.

16. An agricultural tire comprising:

a pair of sidewalls;

a circumferential tread constructed of a base rubber,
wherein the circumferential tread has a plurality of bars, each of the plurality of bars having a top surface and a plurality of side surfaces, and
wherein the circumferential tread further has a plurality of valleys disposed between the plurality of bars;

a first reinforcement layer disposed on the circumferential tread, such that the first reinforcement layer covers at least a portion of the side surfaces of the plurality of bars and further covers the plurality of valleys, the first reinforcement layer having a first color;

a second reinforcement layer disposed on the first reinforcement layer, such that the second reinforcement layer covers the first reinforcement layer, the second reinforcement layer having a second color different than the first color so as to facilitate visual detection of wear of the tire; and an outer layer disposed on at a least a portion of the second reinforcement layer, wherein at least one of the first and second fabric reinforcement layers has a hardness that is at least 10% greater than the hardness of the base rubber.

17. The agricultural tire of claim 16, wherein the base rubber has a lower hardness than the first reinforcement layer.

18. The agricultural tire of claim 16, wherein the base rubber has a lower hardness than the outer layer.

19. The agricultural tire of claim 16, wherein the first reinforcement layer includes fabric cords.

20. The agricultural tire of claim 16, wherein the first reinforcement layer includes chopped fiber.

* * * * *